United States Patent [19]

Malak

[11] 4,451,992
[45] Jun. 5, 1984

[54] METHOD AND APPARATUS FOR POSITIONING A SHAFT ALIGNING SENSING STRUCTURE ON A SHAFT

[75] Inventor: Stephen P. Malak, Milwaukee, Wis.

[73] Assignee: Spring - Mornne, Inc., Milwaukee, Wis.

[21] Appl. No.: 430,332

[22] Filed: Sep. 30, 1982

[51] Int. Cl.³ .............................................. G01B 5/24
[52] U.S. Cl. .................................... 33/412; 33/180 R
[58] Field of Search ................. 33/181 R, 180 R, 412, 33/178 F

[56] References Cited

U.S. PATENT DOCUMENTS

| | | | |
|---|---|---|---|
| 600,049 | 3/1898 | Thompson | 33/412 |
| 2,656,607 | 10/1953 | Harding | 33/412 |
| 4,161,068 | 7/1979 | McMaster | 33/412 |

Primary Examiner—Harry N. Haroian
Attorney, Agent, or Firm—Stephen P. Malak

[57] ABSTRACT

A method and apparatus for positioning a shaft aligning sensing structure on a shaft to a calibrated position comprising, a support, first means on the support controlling movement of the shaft aligning sensing structure from a first position to a second position, positioning means mounted on the support acting with the surface of the shaft and cooperating means mounted on the shaft aligning sensing structure responsive to the positioning means, whereby the positioning means reacts to the diameter of the shaft and causes the cooperating means to position the shaft aligning sensing structure at the calibrated position.

26 Claims, 7 Drawing Figures

METHOD AND APPARATUS FOR POSITIONING A SHAFT ALIGNING SENSING STRUCTURE ON A SHAFT

BACKGROUND OF THE INVENTION

Field of Invention

This invention relates to shaft alignment devices and in particular, to static shaft alignment devices directed to axially aligning a first shaft with a second shaft.

The shaft alignment devices as described in U.S. Pat. No. 4,115,925 and my pending application U.S. Ser. No. 6/430,333, filed September 30, 1982, disclose shaft alignment sensing structures as fixedly mounted to a shaft mount support. Although this arrangement is suitable in situations where the two shafts to be aligned are of the same diameter, the general situation encountered is two shafts having different diameters. To compensate for the difference in shaft diameters, U.S. Pat. No. 4,115,925 discloses one approach utilizing spacers on one shaft mount support, which spacers are equivalent in thickness to the difference between the radii of the two shafts. The spacers are used on the shaft mount support mounted on the smaller diameter shaft. This approach has problems. First, the operator of the shaft alignment device must first measure the diameters of the two shafts and make a calculation to determine the difference in the shaft radii to establish the correct spacer to us. Second, a substantial range of spacers must be available to accommodate the large range of radii differences encountered. Third, the spacers can be difficult to place on the shaft mount support when the radii difference is very small.

SUMMARY OF THE INVENTION

It is therefore, a general object of this invention to provide a simple method and apparatus that automatically positions, to a predetermined calibrated position, a shaft aligning sensing structure on shafts having different diameters.

The apparatus of the present invention comprises a support, generally in the form of a V-block, having first means mounted thereon to control the movement of the shaft aligning sensor structure from a first position to a second position. The support also has mounted thereon a positioning means which acts with the surface circumference of the shaft to sense the diameter of the shaft. Mounted on the shaft aligning sensing structure is a cooperating means which responds to the positioning means. In operation, upon mounting the support on the shaft, the positioning means reacts in a predetermined manner to the shaft diameter and causes the cooperating means to position the shaft aligning sensing structure at a designed calibrated position.

An additional object of this invention is to provide a positioning structure that does not interfere with the mounting and the dismounting of the apparatus on the shaft.

A further object of this invention is to provide an apparatus for positioning a shaft aligning sensing structure on a shaft which does not require measuring the shaft diameter and does not require the use of spacers.

A still further object of this invention is to provide a method of positioning a shaft aligning sensing structure to a calibrated position.

BRIEF DESCRIPTION OF THE DRAWINGS

With reference to the above objects of the invention and other objects and advantages which will appear in the following description taken in connection with the accompanying drawings.

DESCRIPTION OF THE PREFERRED ENBODIMENT

Figure 1:
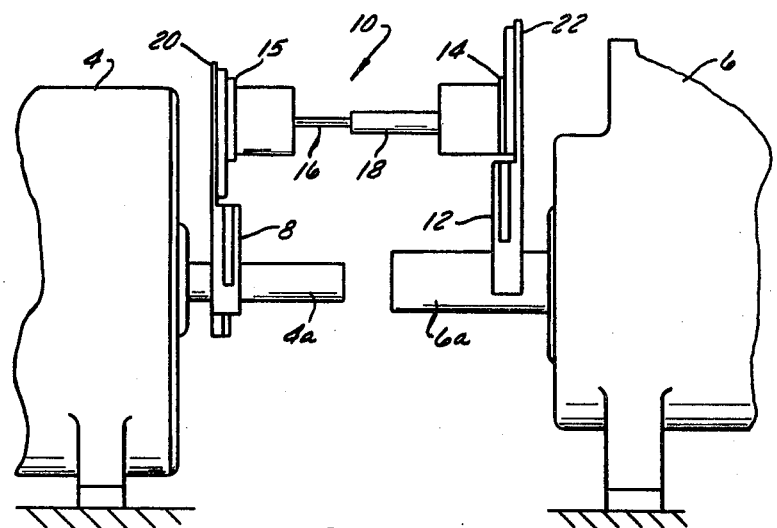
FIG. 1 is a side view of the shaft aligning sensing structures shown mounted on the shafts of a driving unit and a driven unit.

Referring in particular to the drawings, FIG. 1 shows a static shaft aligner generally at 10 comprising a first shaft aligning sensing structure 14 and a second shaft aligning sensing structure 15 as disclosed and described in U.S. Pat. No. 4,115,925 or as disclosed and described in my pending application U.S. Ser. No. 6/430,333. The present invention is useable for both types of sensing structures. The shaft aligning sensing structure disclosed in U.S. Pat. No. 4,115,925 is a universal joint consisting of two yokes connected by a central support. The universal joint is a dual-axis sensing structure wherein each yoke has an axial sensing means mounted thereon to detect angular movement of one yoke with respect to the other. The shaft aligning sensing structure disclosed in pending application U.S. Ser. No. 6/430,333 consists of a dual-axis radiation sensing means and means for providing a radiation beam. Accordingly, in each instance both types of shaft aligning sensing structures are dual-axis sensing structures which provide position or motion detection with appropriately mounted position sensors. If the sensing structures are those described in U.S. Pat. No. 4,115,925 then they will be interconnected for communication by the telescoping members 16 and 18. The sensing structures 14 and 15 are mounted on supports 12 and 8, respectively, at support back portions 22 and 20, respectively. The shaft mount supports 8 and 12 are shown vertically positioned, which is the preferred mode of operation, on shaft 4a of driving unit 4 and shaft 6a of driven unit 6, respectively.

Figure 2:
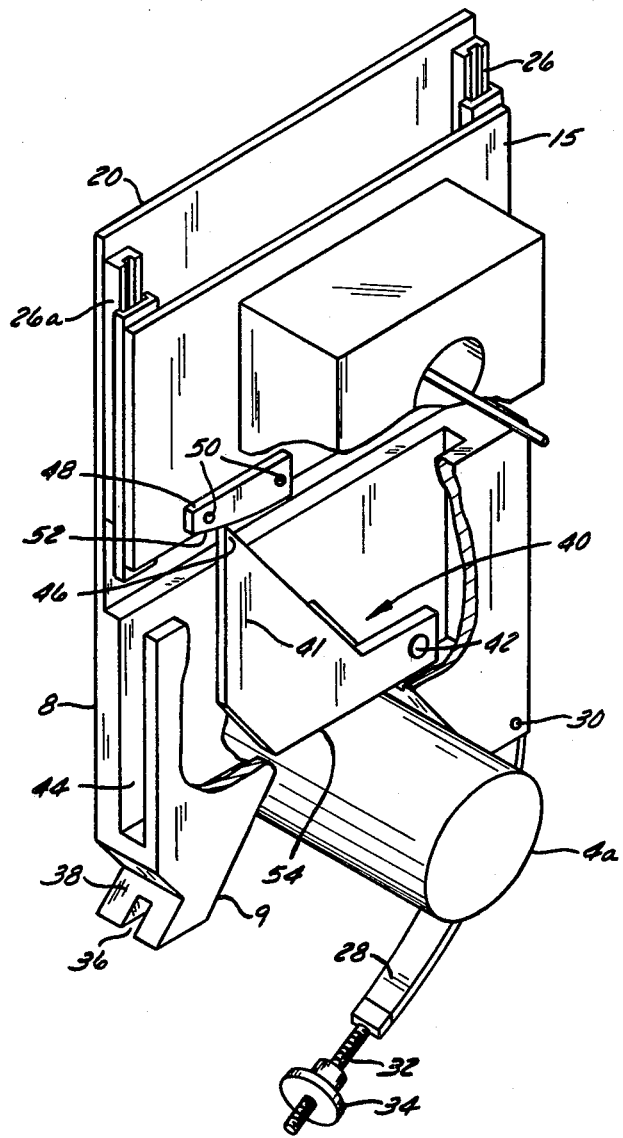
FIG. 2 is a perspective view partially in section showing the positioning apparatus of the present invention.

Referring in particular to FIG. 2 the support 8 has a preferred configuration V-block shape with V-portion 9 straddling shaft 4a. The support can be releasably mounted on the shaft by a strap 28 pivotally secured by pin 30 to the support. The strap terminates in a threaded portion 32 which fits into slot 36 on the support. Thumb screw 34 is then adjusted until it locks on surface 38 and draws the strap tightly around and under the shaft thereby securely mounting the support on the shaft.

Figures 3, 3A:
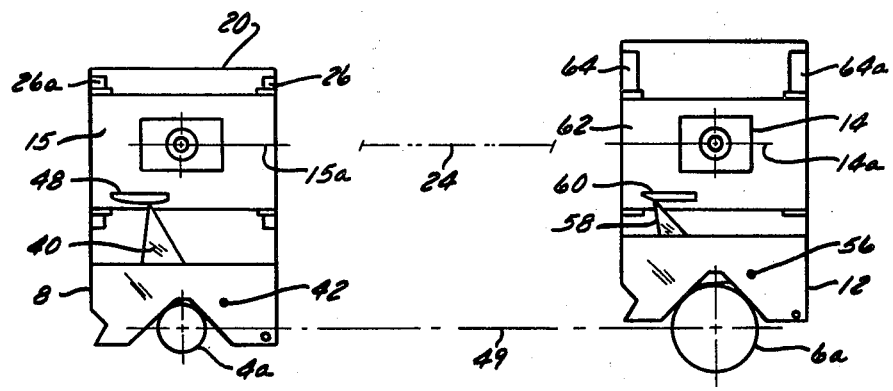
FIG. 3 is a front view of the apparatus of FIG. 2 showing it mounted on a small diameter shaft.
FIG. 3a is a front view of the apparatus of FIG. 2 showing it mounted on a large diameter shaft.

The support 8 has a slot 44 having mounted therein a positioning means 40 which acts through contact surface 54 on the surface of the shaft. Although the positioning means is shown mounted within the support, this is not a requirement, as it will work equally well if located on the outer surface of the support. The arrangement shown is the preferred one. The positioning means 40 is essentially a sensing means mounted on the support for sensing the shaft diameter present in V-portion 9 of the support. As shown the positioning means comprises a pivot arm 41 pivotally mounted on the support at pin 42. The pivot arm has defined thereon a contact area 46. Cooperating means 48, mounted by screws 50 on sensing structure 15, in one form is a cam having a contact surface 52 which responds to the position of contact area 46. The position of contact area 46 will depend upon the size of the shaft diameter present. For small shaft diameters, the shaft 4a will seat deeper into the V-portion 9 and cause pivot arm 41 to rotate clockwise from the position shown and thereby position the contact area 46 to a higher position as shown in FIG. 3. For larger diameter shafts, the shaft will not seat as deep in the V-portion and the pivot arm will rotate counter-clockwise and thereby position the contact area to a lower position as shown in FIG. 3a.

Referring back to FIG. 2, there is shown a first means 26 and 26a mounted on the support 8 at back portion 20, for slideably mounting the sensing structure 15 on the support. The first means can be, as example, linear slide bearings or Vee-grooved wheels riding on Vee-tracks. The first means controls the movement of the sensing structure as it is moved from a first position to a second position depending on the shaft diameter within V-portion 9. Similarly, support 12 shown in FIG. 3a carrying sensing structure 14 has positioning means 58 pivotally mounted on the support 12 at pin 56. Cooperating means 60, similar to means 48, is mounted on the sensing structure 14 and is responsive to the contact area on positioning means 58 as previously described for support 8. The means for controlling sliding movement of the sensing structure 14 is shown at 64 and 64a and is similar to first means 26 and 26a.

The object of the positioning apparatus of the present invention is best described with reference to FIGS. 3 and 3a. Support 8 is shown mounted on a small diameter shaft 4a and support 12 is shown mounted on a larger diameter shaft 6a. The centerline of the two shafts, for illustrative purposes, are shown in line with each other at centerline 49. It is desired that the centerlines 14a and 15a of sensing structures 14 and 15, respectively, also be in line at a predetermined calibrated postion 24, so that the shaft aligning sensing structures can operate according to their designed functions as described in the mentioned issued patent and pending patent application. The support 8 seats lower near centerline 49 whereas the support 12 seats further away from centerline 49. If the sensing structures were fixed to their respective supports, their respective centerline 14a and 15a position themselves at different positions with respect to the calibrated position 24. However, the positioning apparatus of the present invention compensates for these shaft diameter differences and assures the correct positioning of the sensing structure centerlines 14a and 15a at the calibrated position 24. The angle chosen for the V-portion of each support and the width of the support will determine the minimum and maximum shaft diameters with which the supports will operate. Depending on the length of the pivot arms of positioning means 40 and 58, each positioning means may not be capable of positioning their respective contact areas to exactly the position desired for positioning the sensing structure centerlines at calibrated position 24. The cams 48 and 60, having respective cam surfaces operating with the respective contact areas of each pivot arm, compensate for errors of the pivot arms accordingly linearize the positioning of the respective sensing structures to the calibrated position 24 within the minimum and maximum shaft diameter range of the supports.

Referring to FIGS. 1 through 3a, the method of positioning on a shaft to a calibrated position, a shaft aligning sensing structure slideably mounted on a support, comprises the steps of: mounting the support on the shaft; providing sensing means on the support for sensing the diameter of the shaft on which the support is mounted; and providing means on the support responsive to the sensing means to position the shaft aligning sensing structure at the calibrated position.

Figures 4, 4A:
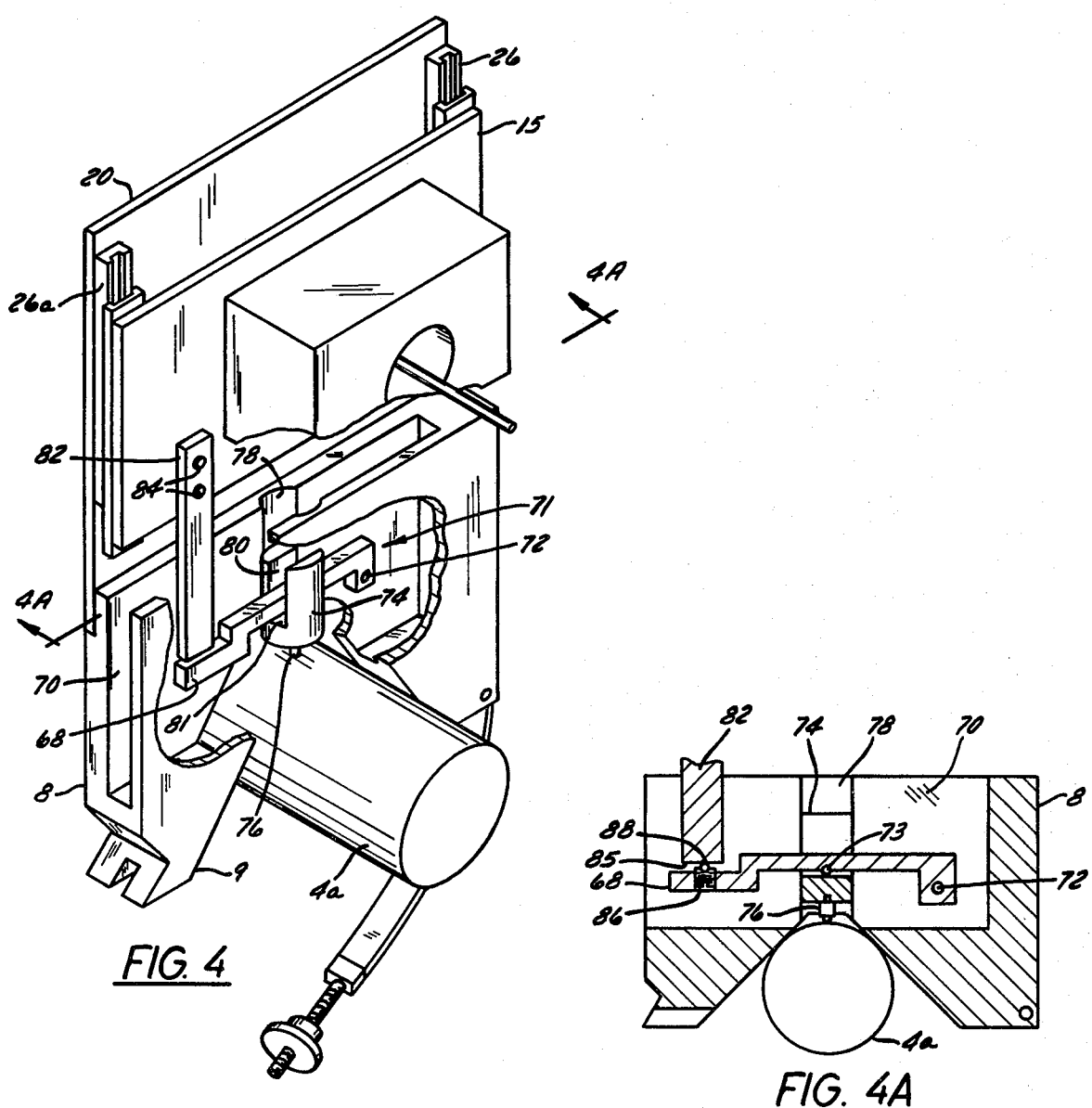
FIG. 4 is a perspective view partially in section showing a first variation of the positioning apparatus.
FIG. 4a is a front view partial cross-section of the positioning apparatus of FIG. 4.

FIGS. 4 and 4a show a first variation of the positioning means generally indicated at 71, acting as a shaft diameter sensing means and a first variation of the cooperating means 82 responsive to the positioning means. Support 8 has defined therein a slot 70 within which the positioning means 71 is mounted for operation. Positioning means 71 comprises a slide member 74 having a slot 80, the bottom of which defines a first surface 81. The slide member is preferably a cylinder but can take other forms as a square or rectangle and work equally well. Pivot arm 68 operates within slot 80 and is pivotally mounted on the support at pin 72. Pivot arm 68 has pivot arm contact means 73 for operation with first surface 81, best shown in FIG. 4a. The pivot arm also has defined thereon a pivot arm contact area 88 cooperating with contact surface 85 of contact means 82. Contact means 82 is mounted on sensing structure 15 by screws 84. As described in FIG. 2, first means 26 and 26a are mounted on the support 8 at back portion 20, for slideably mounting and positioning sensing structure 15 on the support.

Pivot arm contact means 73 can be a sphere as shown or knife edge, and pivot arm contact area 88 can be a sphere, such as ball bearing, or knife edge. Contact area 88 can also be made adjustable for calibration purposes, by mounting it on an adjusting screw 86 operating in pivot arm 68. Slide member 74 can also have defined thereon a slide contact area 76 for resting on the surface of shaft 4a.

In operation, upon mounting the support 8 on the shaft, slide member 74 will position higher in bore 78 for small diameter shafts and will position lower in bore 78 for larger diameter shafts. Depending on the shaft diameter slide member 74 will cause pivot arm 68 to rotate clockwise or counter-clockwise and position contact area 88 accordingly. Contact means 82, shown essentially as a straight bar, will accordingly position higher for small diameter shafts and lower for large diameter shafts and accordingly position the sensing structure 15 at a predetermined calibrated position as previously described in FIGS. 3 and 3a.

Figure 5:
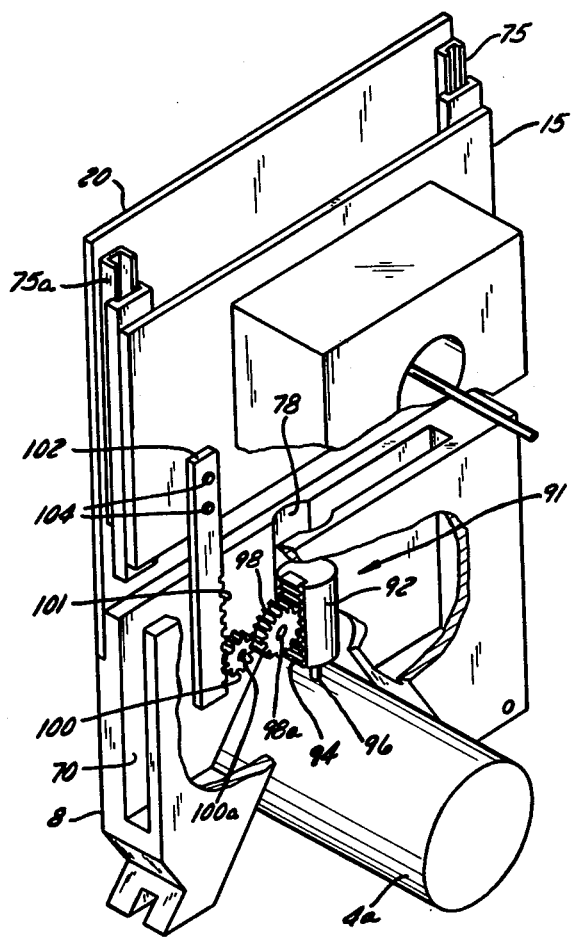
FIG. 5 is a perspective view partially in section showing a second variation of the positioning apparatus.

FIG. 5 shows a second variation of the positioning means, generally indicated at 91, acting as a shaft diameter sensing means and a second variation of the cooperating means 102 responsive to the positioning means. Support 8 has defined thereon a slot 70 within which the positioning means 91 is mounted for operation. Positioning means 91 comprises a slide member 92 operating in bore 78 and has defined thereon a slide rack 94. As with slide member 74 of FIG. 4, slide member 92 is preferably a cylinder. Operating with rack 94 is a gear means defined by gears 98 and 100 mounted on the support by pins 98a and 100a, respectively. Operating with gear 100 is contact means 102 mounted on sensing structure 15 by screws 104, which contact means has defined thereon a rack 101. First means 75 and 75a are mounted on back portion 10 of support 8, for slideably mounting sensing structure 15 to the support. First means 75 and 75a is similar to first means 26 and 26a described in FIG. 2. Slide member 92 can have defined thereon a slide contact point 96 for resting on the surface of shaft 4a.

In operation, upon mounting the support 8 on the shaft, slide member 92 will position higher in bore 78 for small diameter shafts and will position lower in bore 78 for large diameter shafts. Depending on the shaft diameter present slide member 92 will activate the gear means to raise contact means 102 for small diameter shafts or lower contact means 102 for large diameter shafts. The contact means 102 in turn will raise or lower the sensing structure to position it at the predetermined calibrated position. The location of the calibrated position will essentially depend on the shaft diameter range with which the positioning apparatus of the present invention will be used and upon the desired height above the centerlines of the shafts it is desired to have the sensing structures operate for shaft alignment purposes. The height above the centerline of the shaft will essentially be determined by the diameter of the largest coupling expected to be encountered within the shaft diameter range selected.

While I have shown and described the preferred embodiment, various modifications and changes to the structure and their mode of operation may be made by those skilled in the art without departing from the true spirit and scope of the invention as defined in the accompanying claims.

I claim:

1. Shaft alignment positioning apparatus, comprising:
a support;
first means mounted on the support for slideably mounting a shaft aligning sensing structure on the support from a first position to a second position;
sensing means mounted on the support; and
contact means mounted on the shaft aligning sensing structure responsive to the sensing means,
whereby the sensing means causes the contact means to position the shaft aligning sensing structure from the first position to the second position.

2. The invention according to claim 1 wherein the support is a V-block and the first means comprises a first linear bearing and a second linear bearing.

3. The invention according to claim 2 wherein the sensing means is a pivot arm having a contact are defined thereon, the pivot arm pivotally mounted on the V-block, and the contact means is a cam cooperating with the contact area.

4. The invention according to claim 2 wherein the sensing means comprises: a slide member slideably mounted on the V-block, the slide member having defined thereon a slot and a first surface; a pivot arm pivotally mounted on the V-block and having pivot arm contact means operating within the slot on the first surface, the pivot arm having defined thereon a pivot arm contact area.

5. The invention according to claim 4 wherein the contact means is a first member having defined thereon a contact surface cooperating with the pivot arm contact area.

6. The invention according to claim 5 wherein the pivot arm contact means is a first spherical surface and the pivot arm contact area is a second spherical surface.

7. The invention according to claim 2 wherein the sensing means comprises: a slide member slideably mounted on the V-block, the slide member having defined thereon a slide rack; and gear means mounted on the V-block for operation with the slide rack.

8. The invention according to claim 7 wherein the contact means is a first member having defined thereon a rack for operation with the gear means.

9. The invention according to claim 7 wherein the slide member is a cylinder.

10. Apparatus for positioning a sensing structure on a shaft to a calibrated position, comprising:
a support mounted on the shaft;
a shaft alignment sensing structure slideably mounted on the support; first means mounted on the support controlling movement of the shaft alignment sensing structure from a first position to a second position;
positioning means mounted on the support acting with the surface of the shaft; and
cooperating means mounted on the shaft alignment sensing structure responsive to the positioning means,
whereby the positioning means reacts to the diameter of the shaft and causes the cooperating means to position the shaft alignment sensing structure at the calibrated position.

11. The invention according to claim 10 wherein the support is a V-block and the first means comprises a first linear bearing and a second linear bearing.

12. The invention according to claim 11 wherein the positioning means is a pivot arm pivotally mounted on the V-block, the pivot arm having defined thereon a pivot arm contact surface acting on the surface of the shaft and a contact area.

13. The invention according to claim 12 wherein the cooperating means is a cam operating with the contact area.

14. The invention according to claim 11 wherein the positioning means comprises: a slide member slideably mounted on the V-block, the slide member having defined thereon a slot and a first surface; a pivot arm pivotally mounted on the V-block and having a pivot arm contact means comprising within the slot on the first surface, the pivot arm having defined thereon a pivet arm contact area.

15. The invention according to claim 14 wherein the contact means is a first member having defined thereon a contact surface cooperating with the pivot arm contact area.

16. The invention according to claim 15 wherein the pivot arm contact means is a first spherical surface and the pivot arm contact area is a second spherical surface.

17. The invention according to claim 10 wherein the positioning means comprises: a slide member slideably mounted on the V-block, the slide member having defined thereon a slide rack, and gear means mounted on the support for operation with the slide rack.

18. The invention according to claim 17 wherein the cooperating means is a first member having defined thereon a rack for operation with the gear means.

19. The invention according to claim 17 wherein the slide member is a cylinder.

20. A method of positioning on a shaft to a calibrated position a shaft aligning sensing structure, wherein the shaft aligning sensing structure is slideably mounted on a support, comprising the steps of:
mounting the support on the shaft;

providing sensing means on the support for sensing the diameter of the shaft; and providing means on the shaft aligning sensing structure responsive to the sensing means to position the shaft aligning sensing structure at the calibrated position.

21. The invention according to claim 20 wherein the support is a V-block and the sensing means is a pivot arm mounted on the V-block, the pivot arm having defined thereon a contact area.

22. The invention according to claim 21 wherein the means on the shaft aligning sensing structure responsive to the pivot arm is a cam cooperating with the contact area.

23. The invention according to claim 20 wherein the support is a V-block and the sensing means comprises: a slide member slideably mounted on the V-block, the slide member having defined thereon a slot and a first surface; a pivot arm pivotally mounted on the V-block and having pivot arm contact means operating within the slot on the first surface, the pivot arm having defined thereon a pivot arm contact area.

24. The invention according to claim 23 wherein the means on the shaft aligning sensing structure responsive to the slide member and pivot arm is a first member having defined thereon a contact surface cooperating with the pivot arm contact area.

25. The invention according to claim 20 wherein the support is a V-block and the sensing means comprises: a slide member slideably mounted on the V-block, the slide member having defined thereon a slide rack; and gear means mounted on the V-block for operation with the slide rack.

26. The invention according to claim 25 wherein the means on the shaft sensing structure responsive to the slide member and gear means is a first member having defined thereon a rack for operation with the gear means.

* * * * *